United States Patent [19]

Okui et al.

[11] Patent Number: 5,327,210
[45] Date of Patent: Jul. 5, 1994

[54] LIGHT MEASUREMENT DEVICE

[75] Inventors: Yoshihiro Okui; Kazuhiko Naruse, both of Osaka; Taketoshi Kawamura, Itami; Shinji Shimizu, Osaka; Mikio Uematsu, Osaka; Hiroshi Furukawa, Osaka; Izumi Horie, Osaka, all of Japan

[73] Assignee: Minolta Camera Kabushiki Kaisha, Osaka, Japan

[21] Appl. No.: 22,790

[22] Filed: Feb. 23, 1993

Related U.S. Application Data

[63] Continuation of Ser. No. 550,447, Jul. 10, 1990, abandoned.

[30] Foreign Application Priority Data

| Jul. 11, 1989 | [JP] | Japan | 1-180048 |
| Jul. 11, 1989 | [JP] | Japan | 1-180049 |
| Jan. 18, 1990 | [JP] | Japan | 2-10133 |

[51] Int. Cl.$^5$ .............................................. G01J 1/42
[52] U.S. Cl. .................................. 356/218; 356/43; 250/238
[58] Field of Search ............ 356/213, 215, 218, 221, 356/223, 226, 227, 229, 230, 243, 43, 44, 435; 355/33; 250/205, 238, 214 R, 214 C; 340/825.06, 825.36, 815.15

[56] References Cited

U.S. PATENT DOCUMENTS

| 4,038,555 | 7/1977 | Freeman | 250/238 |
| 4,479,780 | 10/1984 | Tokuda | 250/214 C |
| 4,790,669 | 12/1988 | Christensen | 356/435 |
| 4,864,356 | 9/1989 | Asano et al. | 355/30 |
| 4,924,081 | 5/1990 | Arima et al. | 250/214 R |
| 5,105,093 | 4/1992 | Niwa | 250/214 C |

FOREIGN PATENT DOCUMENTS

0044525  2/1991  Japan ...................................... 356/43

OTHER PUBLICATIONS

"Sensor Technology 5" Japanese magazine issued Apr. 20, 1985.
"TV-Analyzer II", Manual of Minolta Camera issued 1985.

Primary Examiner—Richard A. Rosenberger
Assistant Examiner—Hoa Q. Pham
Attorney, Agent, or Firm—Price, Gess & Ubell

[57] ABSTRACT

A light measurement device includes a photoelectric converter for receiving light from an object to be measured and converting the light to a measuring electrical energy in accordance with the intensity of the light, an offset amount measurement device for measuring the offset amount of the photoelectric converter, temperature measurement device for measuring a first temperature of the photoelectric converter when measuring the offset amount, and a second temperature of the photoelectric converter when measuring the light from the object, a memory device for storing a characteristic of the photoelectric converter with respect to temperature, correction amount calculation device for calculating a correction amount based on the characteristic, the first temperature, and the second temperature, and a light intensity calculation device for calculating a light intensity based on the measuring electrical energy, the offset amount, and the correction amount.

14 Claims, 17 Drawing Sheets

LIGHT MEASUREMENT DEVICE

This is a continuation of application Ser. No. 07/550,447, filed on Jul. 10, 1990 now abandoned.

BACKGROUND OF THE INVENTION AND RELATED ART STATEMENT

1. Field of the Invention

This invention relates to a light measurement device provided with a photoelectric conversion circuit for converting the intensity of incident light from an object to be measured.

2. Description of the Prior Art

Increasingly higher accuracy has been required in recent years for such a light measurement device for use in measurement of white balance of computer displays or TV screens, for example. A photosensor and a photoelectric conversion circuit including an amplifier for amplifying the output of the photosensor which together constitute a light measurement device are susceptible to the effect of temperature variations. Various measures are taken to overcome this problem to achieve a required accuracy.

FIG. 12 shows a typical arrangement used in conventional photoelectric conversion circuits. As shown in the figure, a photosensor PC2 is connected across the inverting and non-inverting inputs of an operational amplifier OP3. The non-inverting input is grounded while the inverting output is connected to an output terminal via a resistor Rf'.

Characteristic lines in FIG. 13 represent relationships between incident light intensity and output voltage VOUT of the photosensor PC2 of the photoelectric conversion circuit shown in FIG. 12 at different temperatures. It is assumed here that the photosensor PC2 has a negative temperature coefficient, that is, the output voltage of the photosensor PC2 decreases as the temperature rises. The output voltage offset level and slope of the characteristic line of the photosensor PC2 vary with change in temperature as shown by L1, L2 and L3 of FIG. 13.

Conventional devices are provided with a thermally sensitive device such as a thermistor in the circuit for temperature compensation. FIG. 14 shows an example of such a circuit.

Referring to FIG. 14, a photosensor PC1 is connected across two input terminals of an operational amplifier OP. The output VOUT of the operational amplifier OP is connected to both an analog-digital converter 20 (hereinafter referred to as ADC) in the succeeding stage and a series circuit including a resistor R and a thermistor RTH. Further, the junction of the resistor R and thermistor RTH is connected to the inverting input of the operational amplifier OP via a resistor RF. The output VOUT is converted into digital data by ADC 20 and delivered to a central processing unit 30 (hereinafter referred to as CPU) which then performs temperature compensation, and is displayed on an indicator 40. Indicated at 50 is a cap which is used to cover the photosensor PC1.

Voltage VRF and output voltage VOUT of the circuit shown in FIG. 14 are given by the following equations, respectively:

$$VRF = -(IP+IB) \times RF + VOFF \quad (1)$$

$$VOUT \approx (R + RTH)/RTH \times VRF = (R + RTH)/RTH \times \quad (2)$$

$$\{-(IP + IB) \times RF + VOFF\}$$

where IP is a photoelectric current, IB is a current drawn from the inverting input of the operational amplifier OP, and VOFF is an offset voltage of the operational amplifier OP.

Conventional temperature compensation will be described below.

(1) Compensation for Variation in the Offset Voltage Level

When the photosensor PC1 is covered by the cap 50, or when IP=0 (hereinafter referred to as resetting), equations (1) and (2) is rewritten as follows, respectively:

$$VRF/dark = -IB \times RF + VOFF$$

$$VOUT/dark = (R+RTH)/RTH \times (-IB \times RF + VOFF)$$

The voltage VOUT/dark is converted into digital data by ADC 20 and the resultant data is stored in an internal memory of CPU 30. Temperature compensation is made by subtracting VOUT/dark from VOUT each time the photosensor PC1 receives incident light.

If there is a change in temperature between the time of measurement and the time of resetting, the values IB and VOFF in equation (2) will also change slightly. As a result, the offset voltage VOUT/dark varies as L1, L2 and L3 in FIG. 13. A resetting action is executed each time measurement is performed to achieve accurate compensation for the change of offset voltage level caused by temperature variations.

(2) Compensation for Variation in the Slope of Characteristic Line

The thermistor RTH is a thermally sensitive device of which resistance normally decreases as the temperature rises. The voltage VRF increases at a smaller rate at higher temperatures as shown in FIG. 13.

By connecting a resistor in series with or in parallel with the thermistor RTH, it is possible to control the value of (R+RTH)/RTH of equation (2) to a desired rate of change with respect to temperature variations. The values of (R+RTH)/RTH at 50° C., 20° C. and −10° C. may be set in this way to satisfy the following relation:

$$(R+RTH/50° C.)/RTH/50° C. > (R+RTH/20° C.)/RTH/20° C. > (R+RTH/-10° C.)/RTH/-10° C.$$

Therefore, by selecting suitable resistance values R and RTH, the rate of change 1/K(T) in VRF with respect to temperature variations is expressed by $$A \times K(T) = (R+RTH)/RTH$$

where A is a constant.

With the substitution of $A \times K(T)$, equation (2) can be expressed as follows:

$$\begin{aligned} VOUT &= A \times K(T) \times V'RF \\ &= A \times K(T) \times VRF/K(T) \\ &= A \times VRF \end{aligned}$$

Accordingly, VOUT having a fixed slope is obtained which is regardless of temperature variations, where V'RF is uniquely defined as a function of incident light and not dependant upon the temperature.

FIG. 15 shows relationship between voltage VRF and incident light intensity after the slopes of the characteristic lines are compensated for temperature variations. As shown in FIG. 15, individual characteristic lines becomes parallel after temperature compensation.

Accordingly, a light measurement device provided with the above-mentioned compensation circuit first obtains the offset voltage level VOUT/dark, or data N0 by resetting the photoelectric conversion circuit. Next, the light measurement device measures incident light to obtain the output voltage VOUT, or data N1. Finally, CPU 30 subtracts N0 from N1 to obtain temperature compensated measurement data.

The resistance R1 of the above-mentioned thermistor RTH has temperature characteristics expressed by $$R1 = R2 \exp B (1/T1 - 1/T2)$$

where R1 is the resistance at temperature T1(K), R2 is the resistance at temperature T2(K), and B is the constant of the thermistor RTH. It is a common practice to connect a resistor in series with or in parallel with the thermistor RTH. This is because the temperature characteristics of the thermistor RTH do not always satisfy the desired temperature characteristics of resistance. In this respect, a relatively large variation in the resistance R2 and constant B of the thermistor RTH in the above equation contribute to the variation in the resistance R1 of the thermistor RTH. It is therefore important for accurate temperature compensation to select a resistor that will suit varying characteristics of each individual thermistor. From the practical point of view, however, it is not only difficult but apt to complicate manufacturing of light measurement devices due to the fact of preparing many different types of resistors. Use of a variable resistor, on the other hand, tends to increase the cost and size of light measurement devices. Moreover, even if exact characteristics of the thermistor RTH can be found, temperature compensation cannot be applied to the whole temperature range. Compensation can actually be made at a few temperature points at best, which is insufficient to ensure the accuracy of measurement.

Furthermore, the conventional temperature compensation technique is impractical in that an operator of the light measurement device has to spend a lot of time resetting the photoelectric conversion circuit for each measurement cycle to ensure accuracy. This is because the conventional temperature compensation technique does not provide the operator with any means of knowing the temperature of the photoelectric conversion device, and the operator can not determine when resetting of the photoelectric conversion circuit is needed. It would be possible to provide a thermometer to monitor the photosensor temperature, however, such a provision would require the operator to check the temperature each time before carring out the measurement which would complicate the process of light measurement.

Also, in conventional light measurement devices, unless a measuring probe is connected with a specified measurement main body, accurate measurement cannot be obtained. Individual measuring probes differ in their characteristics due to variations in the manufacturing process or in their relationship with a measurement main body to which the measuring probe is connected, for example. The difference among individual measuring probes also comes from variations in the characteristics of various electric devices used in the measuring probes. It used to be a common practice to correct the light measurement device to ensure its accuracy before making actual measurement with a measuring probe connected to the main body of a light measurement device. A common serial number was marked on both the measuring probe and the main body to enable an operator to identify their proper combination referring to the serial number.

A drawback of this conventional device is that the operator is required to check the serial number each time he connects the measuring probe to the main body.

As the operator has to visually check the serial number, it is likely to happen that he misreads the serial number or even forgets to check it. In such a case, measurement is carried out with a wrong combination of the measuring probe and main body. Consequently, the light measuring system cannot be properly corrected and measured data will contain an error. It could be seen that if the operator is not aware of the error in the obtained data, and the quality and performance of products measured by this light measurement device are determined based on data having such an error, the reliability of the products is lessened.

SUMMARY OF THE INVENTION

Accordingly, an object of the present invention is to provide a light measurement device which makes it possible to overcome the above-mentioned drawbacks.

A light measurement device of the present invention comprises photoelectric conversion means for receiving light from an object to be measured and converting the light to a measuring electrical energy in accordance with the intensity of the light, offset amount measurement means for measuring the offset amount of the photoelectric conversion means, temperature measurement means for measuring a first temperature of the photoelectric conversion means when measuring the offset amount, and a second temperature of the photoelectric conversion means when measuring the light from the object, memory means for storing a characteristic of the photoelectric conversion means with respect to temperature, correction amount calculation means for calculating a correction amount based on the characteristic, the first temperature, and the second temperature, and light intensity calculation means for calculating a light intensity based on the measured electrical energy, the offset amount, and the correction amount.

Another light measurement device comprises photoelectric conversion means for receiving light from an object to be measured and converting the light to an electrical energy in accordance with the intensity of the light, offset amount measurement means for measuring the offset amount of the photoelectric conversion means, temperature measurement means for measuring a first temperature of the photoelectric conversion means when measuring the offset amount, and a second temperature of the photoelectric conversion means when measuring the light from the object, light intensity calculation means for calculating a light intensity based on the measuring electrical energy and the offset amount, and warning means for warning when the difference between the first temperature and the second temperature is more than a predetermined value.

Another light measurement device comprises a main body to which a measuring probe is connectable, the measuring probe having a discriminatory number, discriminatory number memory means for storing the discriminatory number of a particular measuring probe suitable to the main body, read means for reading the discriminatory number of a measuring probe connected to the main body, check means for checking whether the read discriminatory number is in agreement with the stored discriminatory number, and warning means responsive to the check means for warning when the read discriminatory number is not in agreement with the stored discriminatory number.

Another light measurement device comprises a main body to which a plurality of measuring probes are connectable, memory means for storing discriminatory numbers of the plurality of measuring probes connectable, the discriminatory numbers being different from one another so as to discriminate the plurality of measuring probes, read means for reading the discriminatory number of a measuring probe connected to the main body, check means for checking whether there is the same discriminatory number as the read discriminatory number in the stored plurality of discriminatory numbers, and warning means responsive of the check means for warning when it is not the same discriminatory number.

Another light measurement device comprises a main body, correction data memory means for storing correction data to correct the output of a particular measuring probe, discrimination means for discriminating whether a measuring probe connected to the main body is the particular measuring probe, and warning means responsive of the discrimination means for warning when the connected measuring probe is not the particular measuring probe.

This and other objects, features and advantages of the present invention will become more apparent upon a reading of the following detailed description and drawings.

DETAILED DESCRIPTION OF PREFERRED EMBODIMENTS OF THE INVENTION

Figure 2:
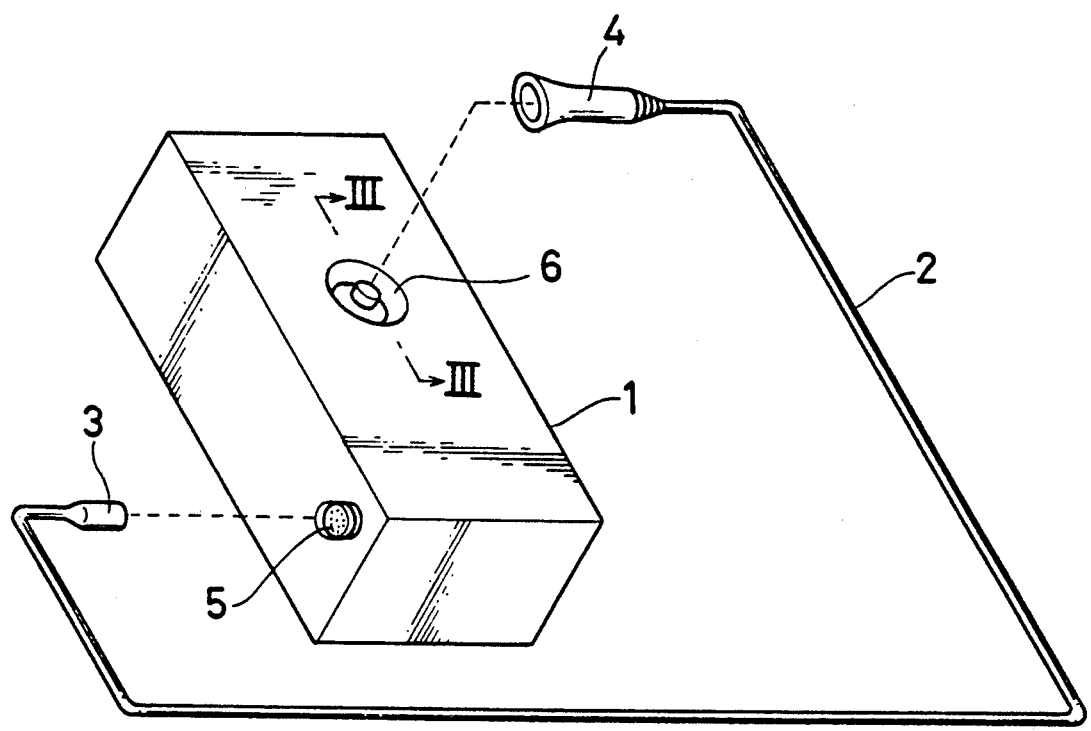
FIG. 2 is a perspective view showing the outside of the light measurement device.

Referring to FIG. 2 showing the outside of a light measurement device of the present invention, indicated at 1 is a main body of the light measurement device and indicated at 2 is a cable. One end of the cable 2 is terminated with a connector 3 while the other end is terminated with a photoelectric conversion element 4. A jack 5 is provided at an appropriate position on the main body 1 so as to allow the operator to connect and disconnect the connector 3. Indicated at 6 is a holding portion for holding the photoelectric conversion element 4. The holding portion is formed in an appropriate position on an upper surface of the main body 1. The photoelectric conversion element 4 is placed in the holding portion 6 when not used.

Figure 3:
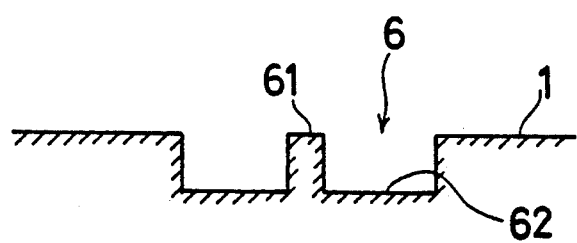
FIG. 3 is a partial sectional view taken along the line III—III in FIG. 2.

FIG. 3 is a sectional view taken on the line III—III in FIG. 2, which shows a vertical cross section of the holding portion 6. As is shown in FIG. 3, a cylindrical hole 62 is formed in the main body 1 and has a constant depth except for a central projection 61. The photoelectric conversion element 4 is held in the holding portion 6 by placing a hood 44 of the photoelectric conversion element 4 in the hole 62. The hood 44 will be described later.

Figure 4A:
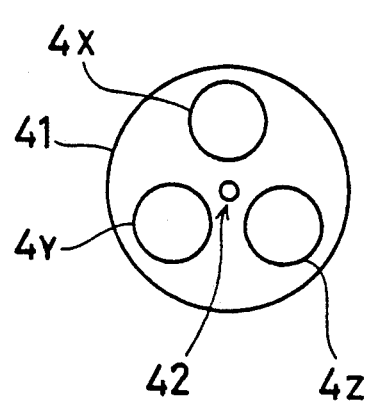
FIG. 4A is a front view of a photosensor used in the light measurement device.
Figure 4B:
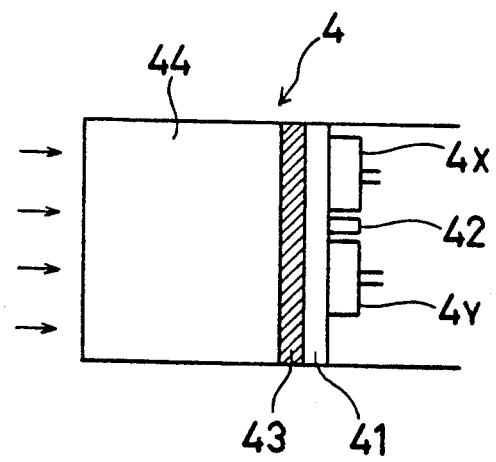
FIG. 4B is a cross sectional view of the photosensor.

FIGS. 4A and 4B show a detailed construction of the photoelectric conversion element 4, FIG. 4A being a front view of the photoelectric conversion element 4, FIG. 4B being a cross sectional view of the photoelectric conversion element 4. Indicated at 4X, 4Y and 4Z are three photosensors, such as silicon photodiodes, having different spectral characteristics with their responses centered at wavelengths λX, λY and λZ. These photosensors 4X, 4Y, 4Z are arranged at apexes of an equilateral triangle, for example, on a surface of a cell holder 41. Provided at an appropriate position such as a center of the cell holder 41 is a temperature sensor 42 for measuring the temperature of the photoelectric conversion element 4. The temperature sensor 42 outputs a current in proportion to absolute temperature (K), for example. The photosensors 4X, 4Y, 4Z which constitute the photoelectric conversion element 4, the temperature sensor 42 and an amplifier (not shown) for amplifying outputs of these sensors are assembled into a metallic cylinder of large heat capacity to help eliminate temperature differences among them. As a result, the photosensors 4X, 4Y, 4Z and the amplifier are kept at the same temperature.

A diffusing plate 43 is attached to a front surface of the cell holder 41 so that incident light falls upon the individual photosensors 4X, 4Y, 4Z at a uniform intensity. Further, mounted at the front of the diffusing plate 43 is the hood 44 having an appropriate length. The photosensor 4X is located at an eccentric position in the photoelectric conversion element 4. Accordingly, the intensity of light falling upon the photosensor 4X tends to fluctuate as the photoelectric conversion element 4 is moved. This situation is the same for the photosensors 4Y and 4Z as well. Accordingly, the hood 44 is provided to minimize the fluctuation of light intensity incident upon the photosensors 4X, 4Y, 4Z. As an example of the effect of the hood 44, it has been proved that the deviation of measurement data due to the fluctuation of light intensity becomes one digit smaller if the length of the hood 44 having a diameter of 21 mm is increased from 2.5 mm to 15.0 mm.

Figure 1:
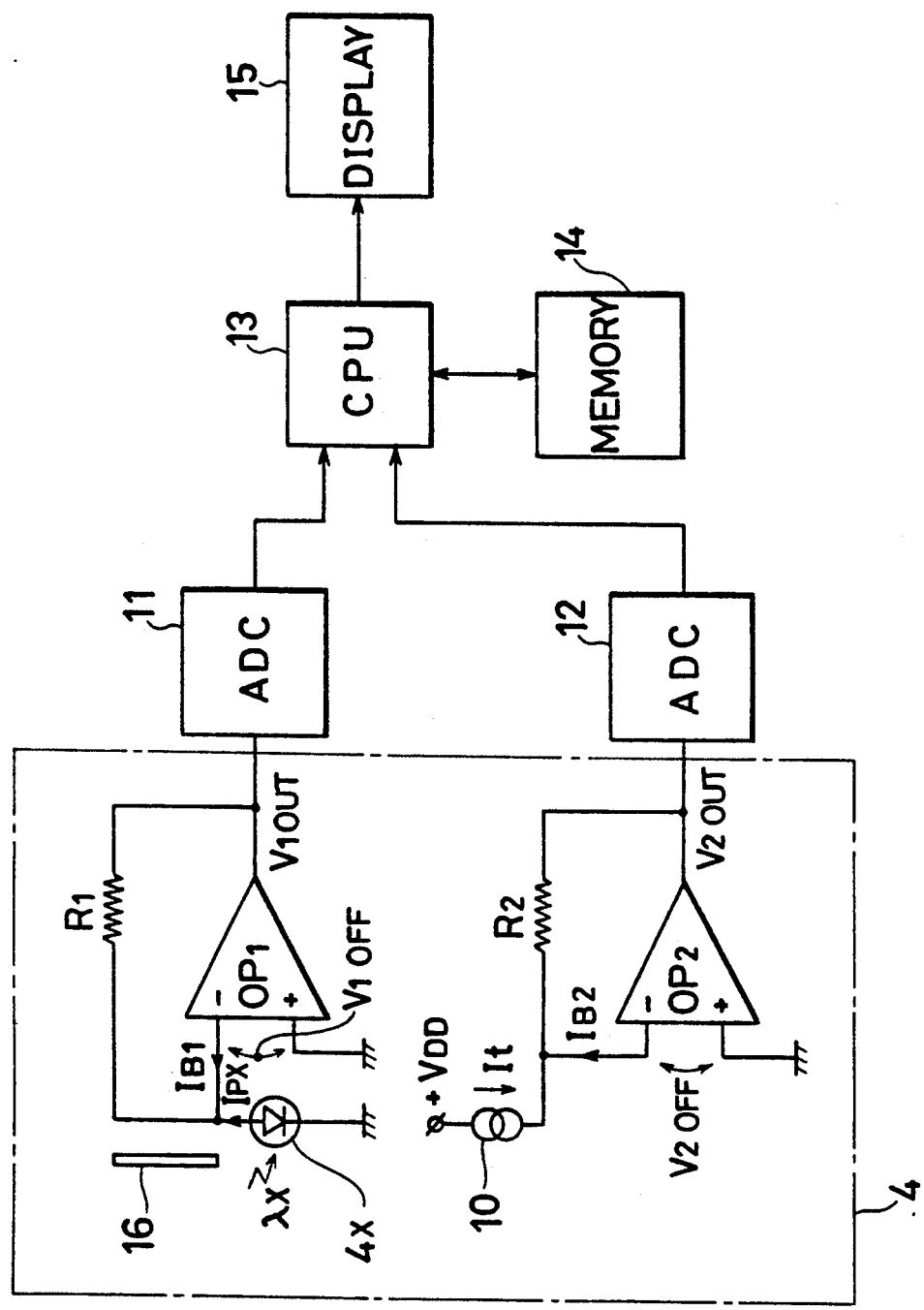
FIG. 1 is a block diagram showing a first light measurement device of the present invention which performs temperature compensation.

Referring to FIG. 1 is a block diagram showing the light measurement device of the present invention, an operational amplifier OP1 converts a photoelectric current IPX to output a voltage while an operational amplifier OP2 converts an output current of the temperature sensor 42 to output a voltage. R1 and R2 are feedback resistors of the respective operational amplifiers OP1 and OP2. ADC 11 and ADC 12 convert analog outputs of the operational amplifiers OP1 and OP2 into digital data, respectively. CPU 13 performs temperature compensation based on measured light intensity data and temperature data sent from ADC 11 and ADC 12, and data stored in a memory 14 as described later. The compensated measurement data is then displayed on a display unit 15. CPU 13 also stores data on the relationship between the photoelectric current IPX and permissible range of temperature variation in the form of a conversion table or formula that is graphically presented in FIGS. 5 and 6 as described later. If an actual temperature variation between the time of resetting and the time of measurement is greater than the permissible range of temperature variation calculated from the stored data, CPU 13 outputs a warning signal to give a visual warning on the display unit 15 or generates an audible warning. A cap indicated at 16 is adopted for interruptting light incident upon the photosensors 4X, 4Y and 4Z at the time of resetting as described later. A buzzer 17 is provided to generate the audible warning.

Described next referring to FIGS. 5 to 11 is temperature compensation of the light measurement device including compensation for variation in the offset voltage and compensation for variation in the slope of the characteristic line. The following description is made with reference to only the photosensor 4X with spectral sensitivity λX. Description of the photosensors 4Y and 4Z is omitted since the same description is applicable.

Figure 5:
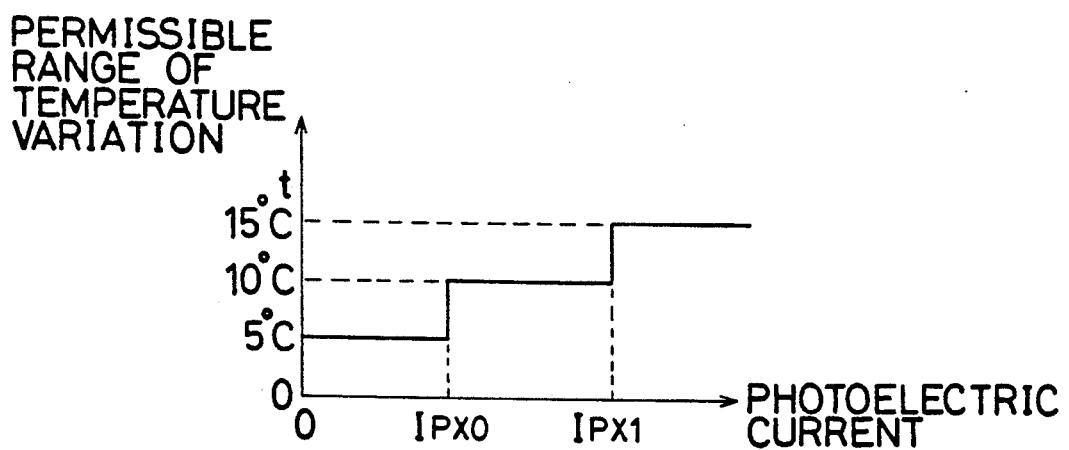
FIG. 5 is a graph showing a relationship between permissible temperature variation t and photoelectric current IPX, where the former is set so as to increase stepwise with the increase in the latter.

FIG. 5 is a graphical presentation of a relationship between the permissible temperature variation t and the photoelectric current IPX, where the former is set so as to increase stepwise with the increase in the latter. In this case, $t=5°$ C. with the photoelectric current IPX being from 0 to IPX0, $t=10°$ C. with the photoelectric current IPX being from IPX0 to IPX1, and $t=15°$ C. with the photoelectric current IPX exceeding IPX1. The graph of FIG. 5 is preset in such a manner that the permissible temperature variation t increases step by step with the increase in IPX.

Figure 6:
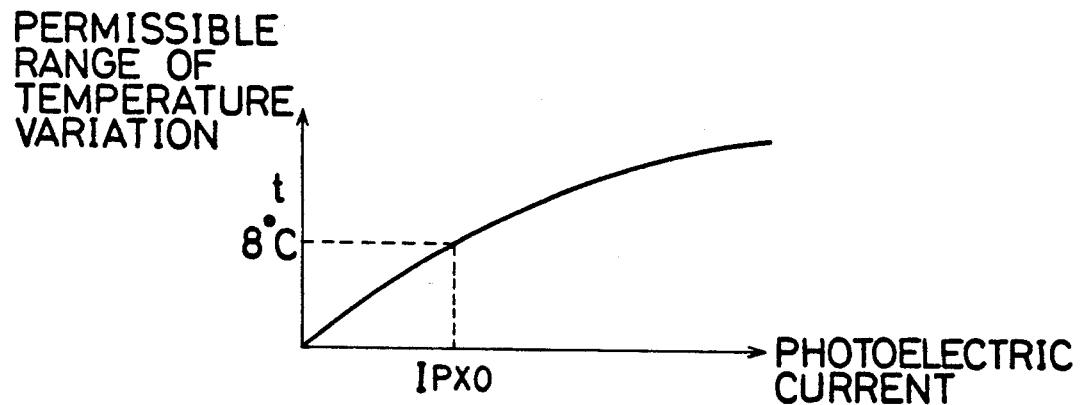
FIG. 6 shows a graph showing another relationship between permissible temperature variation t and photoelectric current IPX, where the former is set so as to gradually increase in the form of a continuous curve with the increase in the latter.

FIG. 6 shows a graphical presentation of a functional relationship in which the permissible temperature variation t is set so as to gradually increase in the form of a continuous curve. In this case, the permissible temperature variation t increases continuously with the increase in the photoelectric current IPX. At point IPX0, the permissible temperature variation is set in $t=8°$ C. By analogy with the graph of FIG. 5, the slope of the function is positive in any way, and this relationship is preprogrammed in a memory 14 (hereinafter referred to as memory M0).

Figure 7:
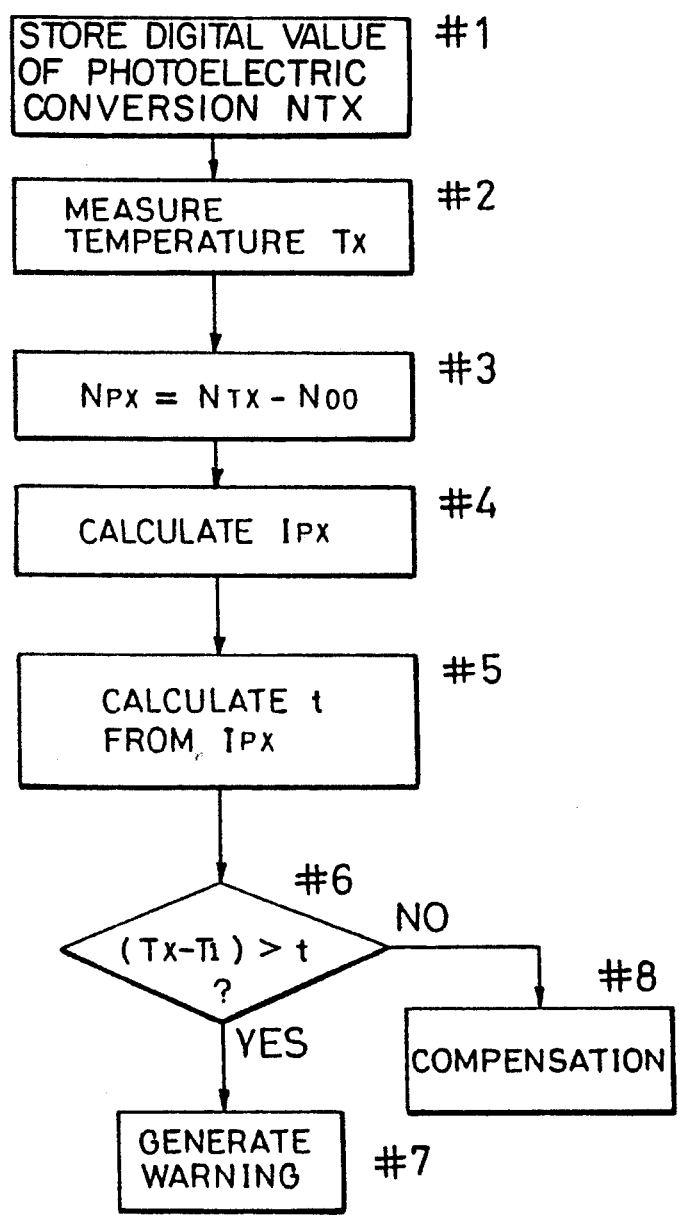
FIG. 7 is a flowchart showing a warning operation of the light measurement device.

FIG. 7 is a flowchart showing an operation for determining whether a warning should be generated or not.

Figure 8:
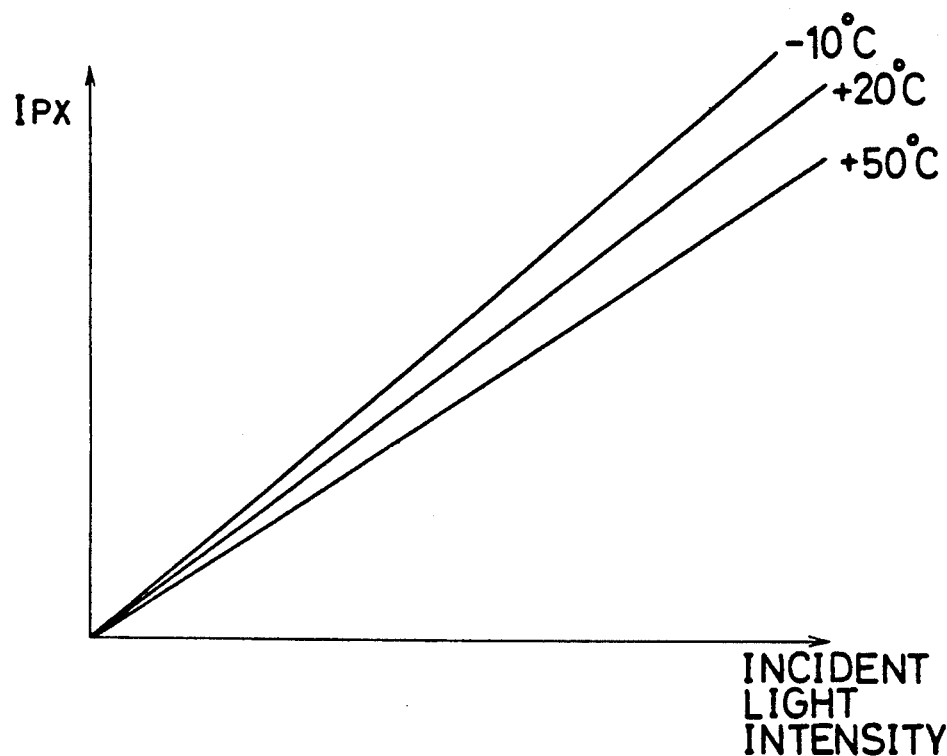
FIG. 8 is a graph showing a relationship between the photoelectric current IPX and the intensity of light incident upon a photosensor, where the temperature is a parameter.
Figure 9:
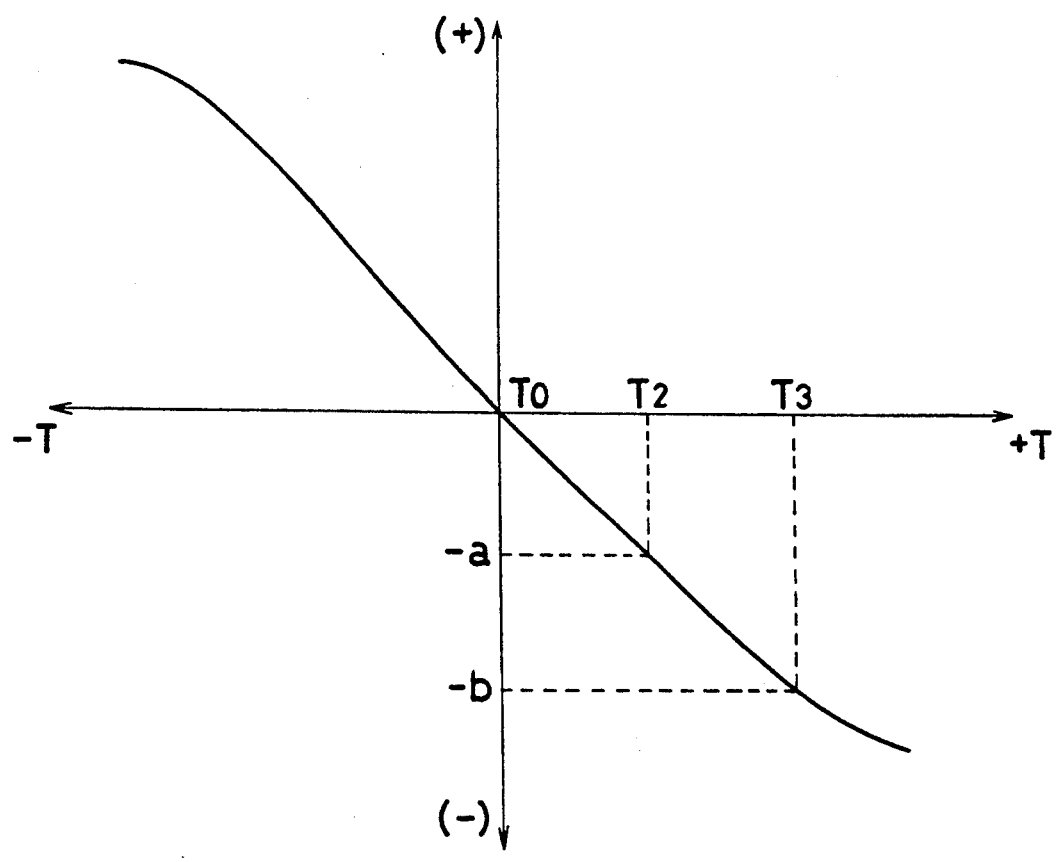
FIG. 9 is a graph showing a relationship between the photoelectric current IPX and temperature variation from a reference temperature of TO° C.

FIG. 8 is a graph showing a relationship between the photoelectric current IPX and the incident light intensity of the photosensor 4X at different temperatures. FIG. 9 is a graphical presentation of the rate of change of the photoelectric current IPX versus temperature variation from a reference temperature TO (°C.). This graph shows the relative rate of change of light intensity, used for temperature compensation of measured data with reference to temperature TO (°C.), and is preprogrammed in memory 14 (hereinafter referred to as memory M1).

Figure 10:
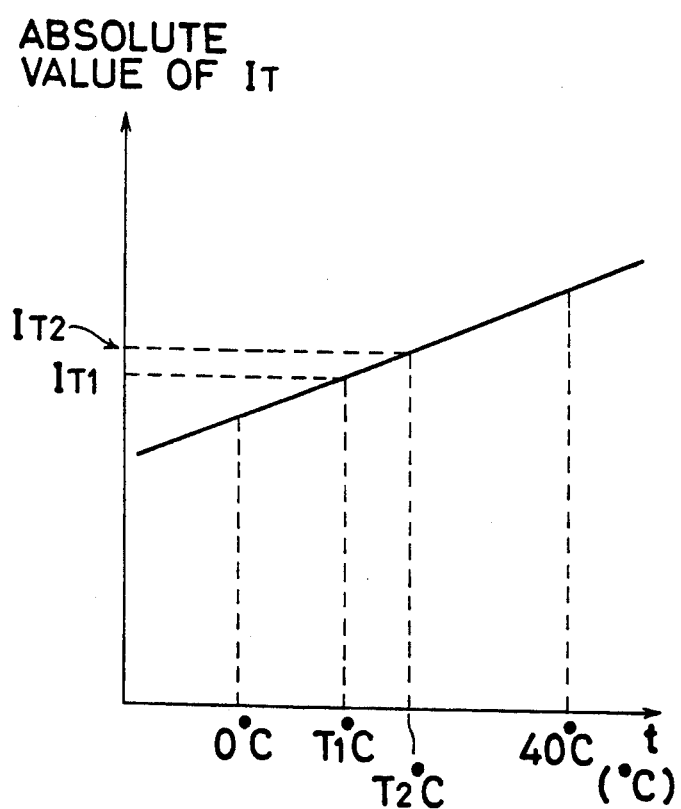
FIG. 10 is a graph showing a relationship between the ambient temperature and the output current of a temperature sensor.

FIG. 10 is a graph of characteristics of the temperature sensor 42 showing a relationship between the ambient temperature and the output current. This graph shows the temperature sensor characteristics and is preprogrammed in the memory 14 (hereinafter referred to as memory M2) in the form of a cross reference table of temperature T (°C.) and output data MT of ADC 12.

(1) Compensation for Variation in the Offset Voltage Level

Since the output current IT of the temperature sensor 42 satisfies the relationship IT IB2, V2OFF can be disregarded by selecting an appropriate value of the feedback resistor R2. Thus, the output voltage V2OUT of the operational amplifier OP2 is obtained as follows.

$$V2OUT = -(IT > + IB2) \times R2 + V2OFF \approx -IT \times R2$$

First, resetting of the photoelectric conversion circuit is executed. When the temperature is T1 at the time of resetting, the output voltage of the operational amplifier OP2 is given as a function of the output current IT1 of the temperature sensor 42 as follows.

$$V2OUT = -IT1 \times R2$$

The output voltage V2OUT is then converted by ADC 12 into digital data MT1. The digital data MT1 is stored in the memory 14 as temperature data at the reset status.

After resetting, the photoelectric conversion element 4 is covered by the cap 16. Since the output current of the photosensor 4X is 0 at this time, V1OUT is given as follows.

$$V1OUT = -IB1 \times R1 + V1OFF$$

The output voltage V1OUT is converted by ADC 11 into digital data N00, which is also stored in the memory 14.

Next, incident light is measured with the cap 16 removed. When the photosensor 4X outputs the photoelectric current IPX, V1OUT is given as follows.

$$V1OUT = -(IPX + IB1) \times R1 + V1OFF$$

Here again, V1OUT is converted by ADC 11 into digital data NT1. Then, NT1 is inputted to CPU 13 which then performs the following calculation to obtain an offset voltage value compensated for temperature variation.

$$NT1 - N00 = IPX \times R1 \quad (3)$$

Now, if there is a change in temperature of the photoelectric conversion element 4 from the initial temperature T1, the offset voltage V1OFF and a leakage current IB1 will also change, resulting in a variation of the offset level obtained by equation (3).

For this reason, CPU 13 stores temperature data MT obtained by the temperature sensor 42 for each measurement cycle and compares it with temperature data MT1 obtained at the time of resetting, When the difference between these temperature data becomes larger than a preset value, CPU 13 outputs a warning signal to alert that an offset voltage error has exceeded the permissible range. Consequently, a visual warning is given on the display unit 15 and an audible warning is generated by the buzzer 17 to annunciate to the operator that correction of the offset voltage level is required again. The offset voltage level is constantly compensated in this way to keep it within a predetermined tolerance range, so that accurate and steady offset voltage compensation can be obtained.

However, there is the following problem. The output voltage V1OUT of the operational amplifier OP1 is obtained as follows.

$$V1OUT = -IB1 \times R1 + V1OFF$$

Given the photoelectric current IPX, the output voltage V1OUT of the operational amplifier OP1 at the time of measurement can be expressed as follows.

$$\begin{aligned} V1OUT &= -(IPX + IB1) \times R1 + V1OFF \\ &= -IPX \times R1 - IB1 \times R1 + V1OFF \end{aligned}$$

Based on the above consideration, the device obtains a light measurement value from the difference between the two output voltages when the temperature difference between the time of resetting and the time of measurement falls within a predetermined range. If, however, the temperature difference between the time of resetting and the time of measurement exceeds the predetermined range, the device issues a warning.

When increments in IB1, V1OFF and V1OUT between the time of resetting and the time of measurement are dIB1, dV1OFF and dV1OUT, respectively, $$dV1OUT = -IB1 \times R1 + V1OFF$$

If the photoelectric current IPX is large enough due to strong incident light, the ratio of dV1OUT to V1OFF becomes small to such an extent that the effect of V1OFF can be disregarded. On the contrary, if the photoelectric current IPX lessens, the ratio of dV1OUT to V1OUT increases and the effect of dV1OUT can no longer be neglected. Considering these points, it would be understood that unconditional resetting of the photoelectric conversion circuit at a preset temperature difference may jeopardize the consistency in the tolerance level and frequent resetting actions can make the measurement process rather complicated.

To ensure a constant accuracy of measurement, it will be seen that it is possible to determine whether a warning should be triggered to urge a resetting action by use of the converted data stored in the memory MO. An operation for determining whether warning is necessary will be described in detail with reference to FIG. 7.

Prior to start of an operation routine shown in FIG. 7, temperature T1 at the time of resetting is stored as temperature data MT1 in the memory 14 as already described.

First, the output of the photoelectric conversion element 4 is converted to a digital value. As soon as the digital value NTX is stored in the memory 14 (Step #1), temperature TX is measured and stored in the memory 14 (Step #2).

Next in Step #3, the offset voltage data N00 obtained at the time of resetting is subtracted from NTX to obtain NPX, from which IPX is calculated using equation (3) (Step #4).

Then, CPU 13 determines the permissible range of temperature variation t corresponding to the photoelectric current IPX from the digital value stored in the memory MO (Step #5). Subsequently, comparison is made between the permissible range of temperature variation t and actual temperature difference (TX−T1) (Step #6).

If the temperature difference (TX−T1) is larger than the permissible range of temperature variation t, or (TX−T1)>t (YES at Step #6), it is determined that the measurement accuracy criteria exceeded the tolerance and outputs a warning signal to generate a visual warning on the display unit 15 and an audible warning by the buzzer 17 (Step #7). The operator is therefore alerted of the need of resetting the photoelectric circuit again. On the contrary, if the answer is NO in Step #6, the routine proceeds to Step #8 to calculate a true measurement value through compensation for variation in the slope of the characteristic line.

It should be noted that for convenience of description, the capital letter T is used to represent the spot temperature and the small letter t is used to express the permissible range of temperature variation, in actual operation, comparison of temperature data is made by using the temperature data MT1 obtained at the time of resetting, the temperature data MTX obtained by converting the temperature detected at the time of measurement stored in the memory 14, and temperature variation data stored in the memory MO. The temperature variation data is stored in the same unit as the temperature data MT1, MTX. As an alternative, the horizontal axes of FIGS. 5 and 6 may be expressed by the same unit as the digital output data (NT1) of ADC 11.

In this embodiment, the permissible temperature variation data is obtained in relation with the photoelectric current IPX. As an alternative, it is also possible to obtain permissible temperature variation data in relation to a value which varies with the change in the photoelectric current IPX, such as NTX obtained in Step #1 or NPX obtained in Step #3. In this case, information on calculation of IPX with reference to NTX or NPX should be stored in the memory M0.

Described next is how the measured value is further compensated for variation in the slope of the characteristic line after the compensation for variation in the offset voltage level.

(2) Compensation for Variation in the Slope of the Characteristic Line

Here, it is assumed that the incident light intensity is already calibrated to obtain accurate measurement data at temperature T2. For this purpose, the analog signal outputted by the photoelectric conversion circuit may be calibrated by a calibration circuit, or the digital data fed from ADC 20 may be multiplied by an appropriate factor in CPU 30.

Temperature T2 at which calibration was made is stored in the memory 14 in the form of data MT2. Data NO0 was already obtained as an offset level at the time of resetting.

Next, when temperature T3 (data MT3) was obtained by the temperature sensor 42 at the time of measurement. Since the data MT3 measured at temperature T3 contains the effect of the characteristics of the device calibrated at temperature T2, it must be compensated for temperature variation factors. To make this compensation, CPU 13 performs the following calculation by using the temperature data MT3 obtained at the time of measurement, temperature data MT2 obtained at the time of calibrating, and rates of relative change $-a\%$ (at temperature T2) and $-b\%$ (at temperature T3) given by the cross reference table stored in the memory M1.

$$NT3-NO0 \times (1-a/100)/(1-b/100) \qquad (4)$$

Formula (4) eliminates the temperature dependant features of the photoelectric conversion element 4 from the measured value taking account of the variation in the slope of the characteristic line. Furthermore, this compensation provides highly accurate measurement data regardless of the rate of change in the photoelectric current outputted by the photosensor.

Although this embodiment is designed to store the rate of relative change as the temperature characteristics of the photosensor, other data and storage methods may be selected to store the temperature characteristics information as long as the relationship between the photoelectric current and temperature can be defined.

Another temperature compensation is described below. In this compensation, the change in the photoelectric current is defined as a linear function of temperature.

Instead of directly storing the cross reference table represented by the graph of FIG. 9 as in the case of the preceding compensation, this compensation is designed to store an equation.

Figure 11:
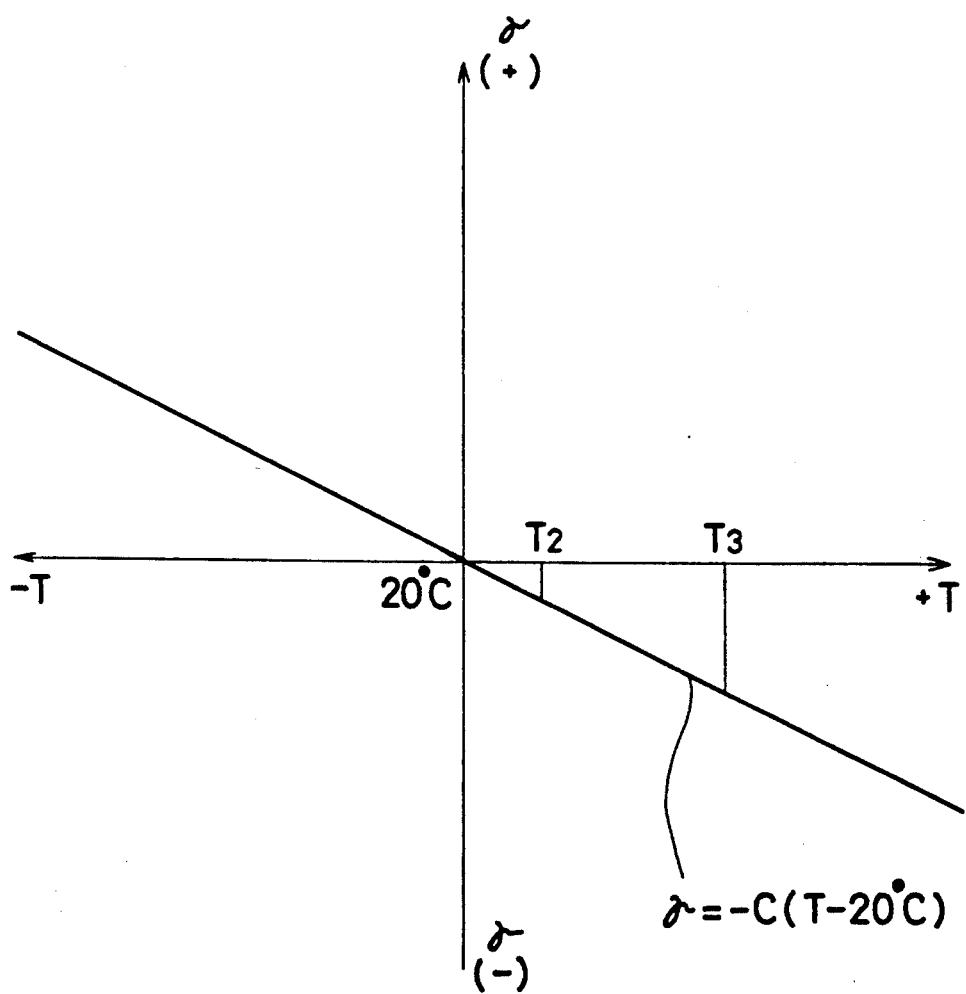
FIG. 11 is a graph showing a relationship between the photoelectric current IPX and temperature variation from a reference temperature of 20° C.
Figure 12:
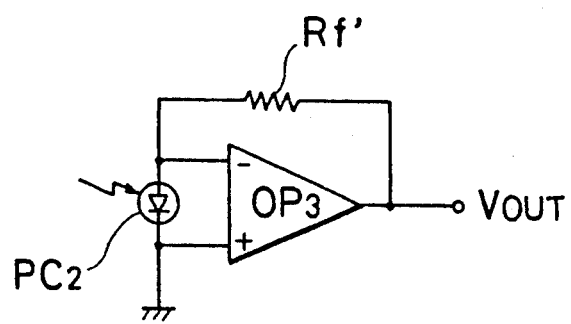
FIG. 12 is a circuit diagram showing a photoelectric conversion circuit of a conventional light measurement device which does not perform temperature compensation.
Figure 13:
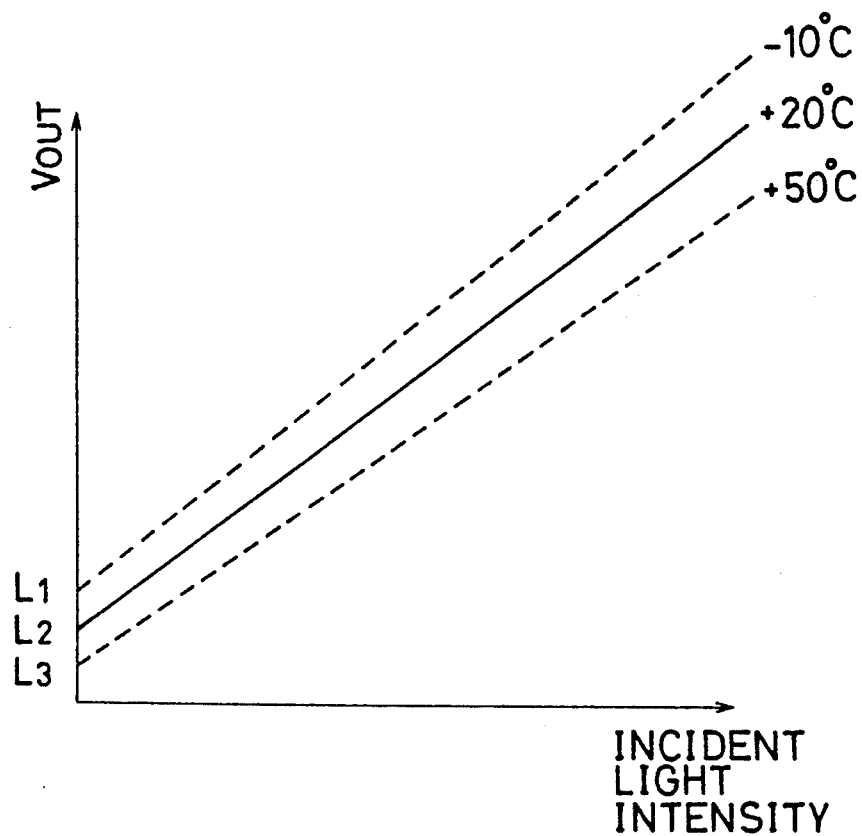
FIG. 13 is a graph showing a relationship between the incident light intensity and the output voltage of the circuit of FIG. 12, where the temperature is a parameter.
Figure 14:
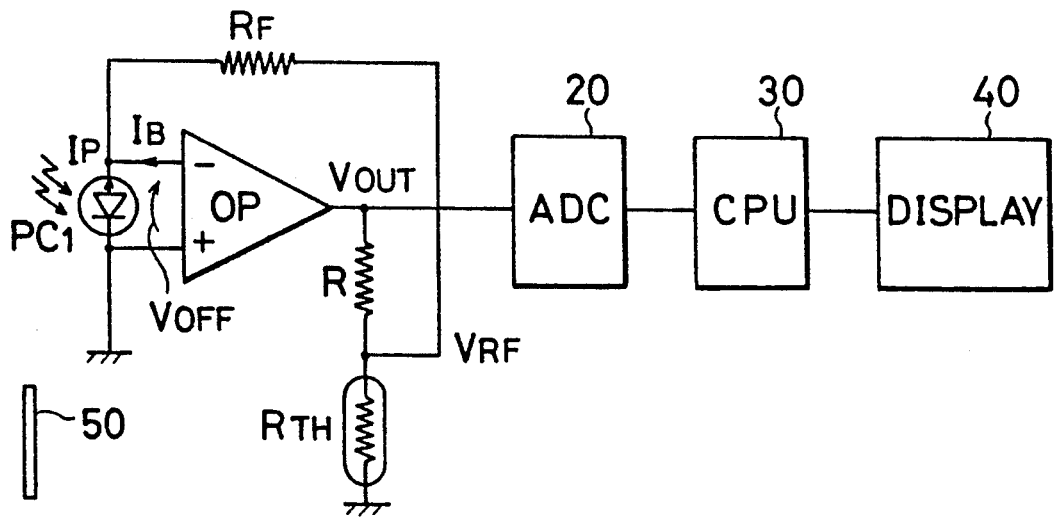
FIG. 14 is a diagram showing a conventional temperature compensation circuit.
Figure 15:
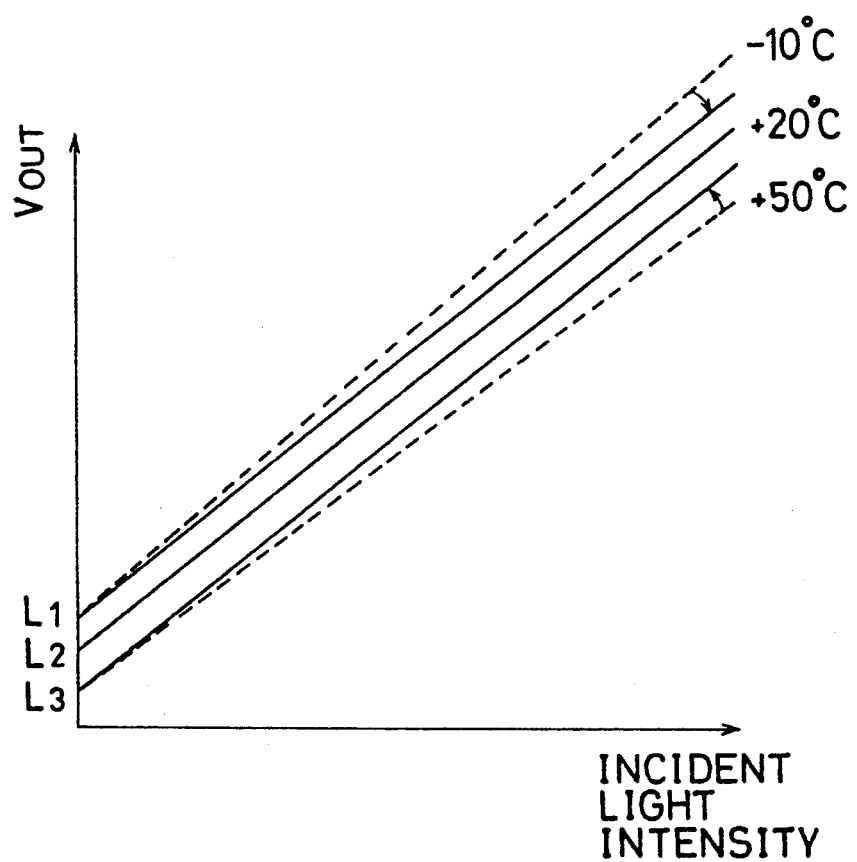
FIG. 15 is a graph showing a relationship between the voltage of the circuit of FIG. 14 and the incident light intensity, where the temperature variation rate is corrected so as to be constant.

More specifically, FIG. 11 is a graphical presentation of the rate of change of the photoelectric current IPX versus temperature variation from a reference temperature of 20° C. at which the device is calibrated to assure accurate measurement. The rate of relative change $\gamma$ is expressed by $$\gamma = -C(T-20° \text{ C.}) \qquad (5)$$

where C is a factor for the rate of change Equation (5) is stored in the memory.

When calibration for the variation in the slope of the characteristic line is made at temperature T2, temperature data MT2 is stored in the memory 14.

Also, offset level NO0 is calculated from the measurement data obtained by covering the photoelectric conversion element 4 with the cap 16 at the time of calibrating and is stored.

Since the above correction is normally carried out at room temperature, temperature T2 at the time of resetting is about 20° C. Therefore, equation (5) can be rewritten $$\gamma \approx -C(T-T2) \qquad (6)$$

Next, normal measurement is executed at temperature T3 with the cap 16 removed. The measured light intensity data is converted by ADC 11 into digital data NT3, which is then inputted to CPU 13. Then, CPU 13 performs the following operation:

$$NT3-NO0=IPX \times R1 \qquad (7)$$

As a next step, CPU 13 substitutes temperature T3 and T2 obtained by the temperature sensor 42 at the time of measurement and at the time of calibrating respectively into equation (6), and divides equation (7).

$$(NT3-NO0)/\{1-C(T3-T2)\}$$

The measured value compensated for the variation in the slope of the characteristic line is finally obtained by the above calculation.

According to this compensation, temperature compensation can be executed only by storing the value of the factor C of the rate of change.

The compensations described above employ a device which outputs a current proportional to the absolute temperature as the temperature sensor. A different type of device, such as s thermistor, can also be used to perform similar compensation. This alternative compensation will enable accurate temperature measurement with a simple circuit configuration without overloading the peripheral circuits of the temperature sensor.

In this case, the relationship between the resistance and temperature of the thermistor to be used is obtained and stored in the memory beforehand, and temperature is determined from the stored data each time a measurement is carried out. According to this alternative compensation, any variation in the thermistor characteristics can be cancelled out only by a partial modification of constants in a calculation program, eliminating the need to change resistance or other circuit constants used in the peripheral circuits of the temperature sensor depending on the characteristics of the thermistor.

Figure 16:
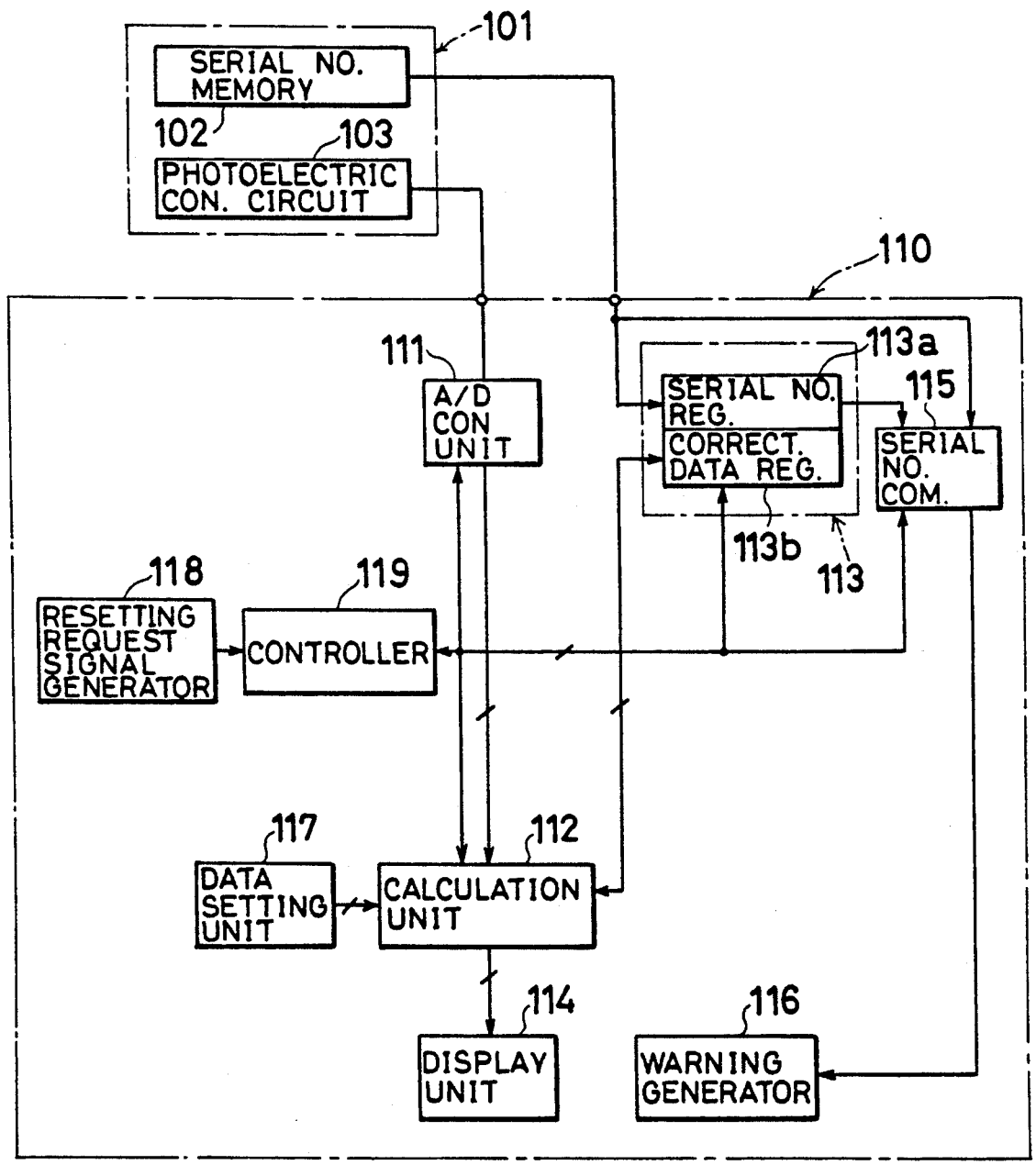
FIG. 16 is a block diagram showing a second light measurement device of the present invention.

Now, referring to FIG. 16 showing a second light measurement device of the present invention, indicated at 101 is a photosensor probe and indicated at 110 is a main body, which constitute the second light measurement device.

The photosensor probe 101 is disconnectable from the main body 110. The photosensor probe 101 includes a serial number memory 102 for storing a specific serial number. The photosensor probe 101 is identified by the specific serial number. Also, the photosensor probe 101 includes a photoelectric conversion circuit 103 for receiving light from an object to be measured and converting it to an electric energy.

The main body 110 includes a unit for calculating a measurement value based on the electric energy from the photoelectric conversion circuit 103, and a unit for comparing the serial number of the photosensor probe 101 and that of the main body 110. More specifically, indicated at 111 is an A/D converter for converting the electric energy outputted by the photoelectric conversion circuit 103 into digital data. Indicated at 112 is a calculation unit for calculating a measurement value through an appropriate processing of the digital data given by the A/D converter 111 and correction data stored in a memory unit 113 to be described later. The memory unit 113 includes a serial number register 113a for storing serial numbers and a correction data register 113b for storing data to be used for correction of data as described later. Before executing correction, the serial number register 113a stores a numeric value "0" for example, which would never be used as a serial number while the correction data register 113b stores a numeric value "1" for example, which does not make any sense as correction data. Indicated at 114 is an indicator for displaying the processed measurement data in the form of a numeric value, for example.

Indicated at 115 is a serial number comparator for comparing the serial number of the photosensor probe 101 and that of the main body 110 of the light measurement device to determine whether they are in agreement with each other. The serial number of the photosensor probe 101 is read out from the serial number memory 101 when the photosensor probe 101 is connected to the main body 110 of the light measurement device. The serial number of the main body 110 is provided by the serial number register 113a. Indicated at 116 is a warning generator for generating an audible or a visual warning when the serial numbers are not in agreement with each other.

Indicated at 117 is a data setting unit in which the operator can manually set data required for correction, indicated at 118 is a resetting request signal generator for outputting a resetting request signal for starting resetting when inputting of correction data from the data setting unit 117 is completed, and indicated at 119 is a controller for delivering the correction data from the data setting unit 117 to the processor 112 for correction calculation on receiving the correction request signal from the resetting request signal generator 118. The calculation unit 112 also causes the correction data register 113b to store the calculation results as correction data. This correction operation is performed before the operator starts measurements by using a certain photosensor probe 101 for the first time or when calibrating the device again with the already connected photosensor probe 101 after the warning has been generated.

The operation of correction (or re-correction) will be described in detail below.

Here, it is assumed that when the photosensor probe 101 measures reference light (reference measurement data O0), the output data of the A/D converter 111 is given as follows.

$$D = (X1, Y1, Z1) \tag{8}$$

Provided that data O1 is obtained by executing a predefined function f to the output data, this data O1 obtained when measuring the reference light with the photosensor probe 101 is expressed by $$O1 = f(X1, Y1, Z1) \tag{9}$$

and displayed on the display unit 114.

To output O0 as a resulting value of the measurement, it is needed to execute the following operation:

$$O0 = f(X0, Y0, Z0) \tag{10}$$

This is achieved when the output data D of the photosensor probe 101 becomes $$D = (X0, Y0, Z0) \tag{11}$$

From the above consideration, it can be understood that the output data D should be first corrected by the following correction factor K and then processed by the predefined function f:

$$K = (X0/X1, Y0/Y1, Z0/Z1) \tag{12}$$

Thus, the reference measurement data O0 ($= f(X0, Y0, Z0)$) is entered through the data setting unit 117. The calculation unit 112 calculates the correction factor K shown in equation (12) from the present output O1 ($= f(X1, Y1, Z1)$) and the reference measurement data O0 entered to the data setting unit 117, and the resultant correction factor K is stored in the correction data register 113b. Then, the correction factor K is read out at later measurements and used as correction data when calculating measurement data.

The output data D obtained when measuring the reference light is converted or corrected to a proper value which is expressed from equations (8) and (12) as follows:

$$\begin{aligned} D \times K &= (X1, Y1, Z1) \times (X0/X1, Y0/Y1, Z0/Z1) \\ &= (X0, Y0, Z0) \end{aligned}$$

This calculation gives a measurement value which coincides with the value obtained from equation (10).

On the other hand, the output data obtained when measuring the reference light with another photosensor probe than the photosensor probe corrected by equation (12) is expressed by $$D = (X2, Y2, Z2) \tag{13}$$

In this case, the corrected data $D \times K$ is $$\begin{aligned} D \times K &= (X2, Y2, Z2) \times (X0/X1, Y0/Y1, Z0/Z1) \\ &= (X2, \times X0/X1, Y2 \times Y0/Y1, Z2 \times Z0/Z1) \end{aligned}$$

Thus, the measurement value O1 is obtained as follows.

$$O1 = f(X2 \times X0/X1, Y2 \times Y0/Y1, Z2 \times Z0/Z1)$$

Now, the measurement value does not coincide with the value given from equation (10). This means that the obtained measurement data is incorrect if measurement is made with another photosensor probe than the corrected one connected to the main body of the light measurement device.

Figure 17:
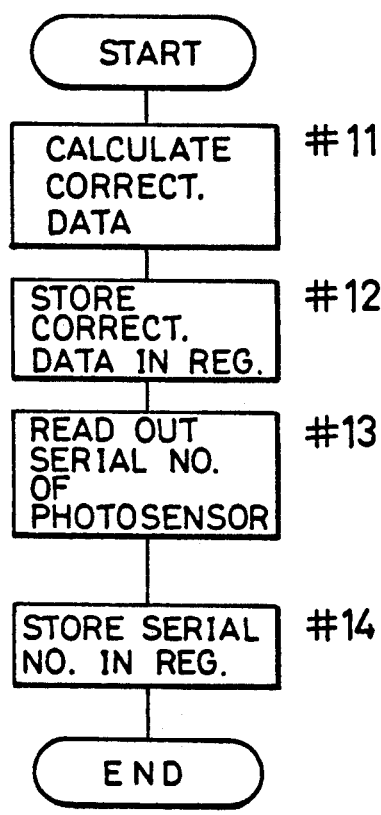
FIG. 17 is a flowchart showing a correction operation of the light measurement device.
Figure 18:
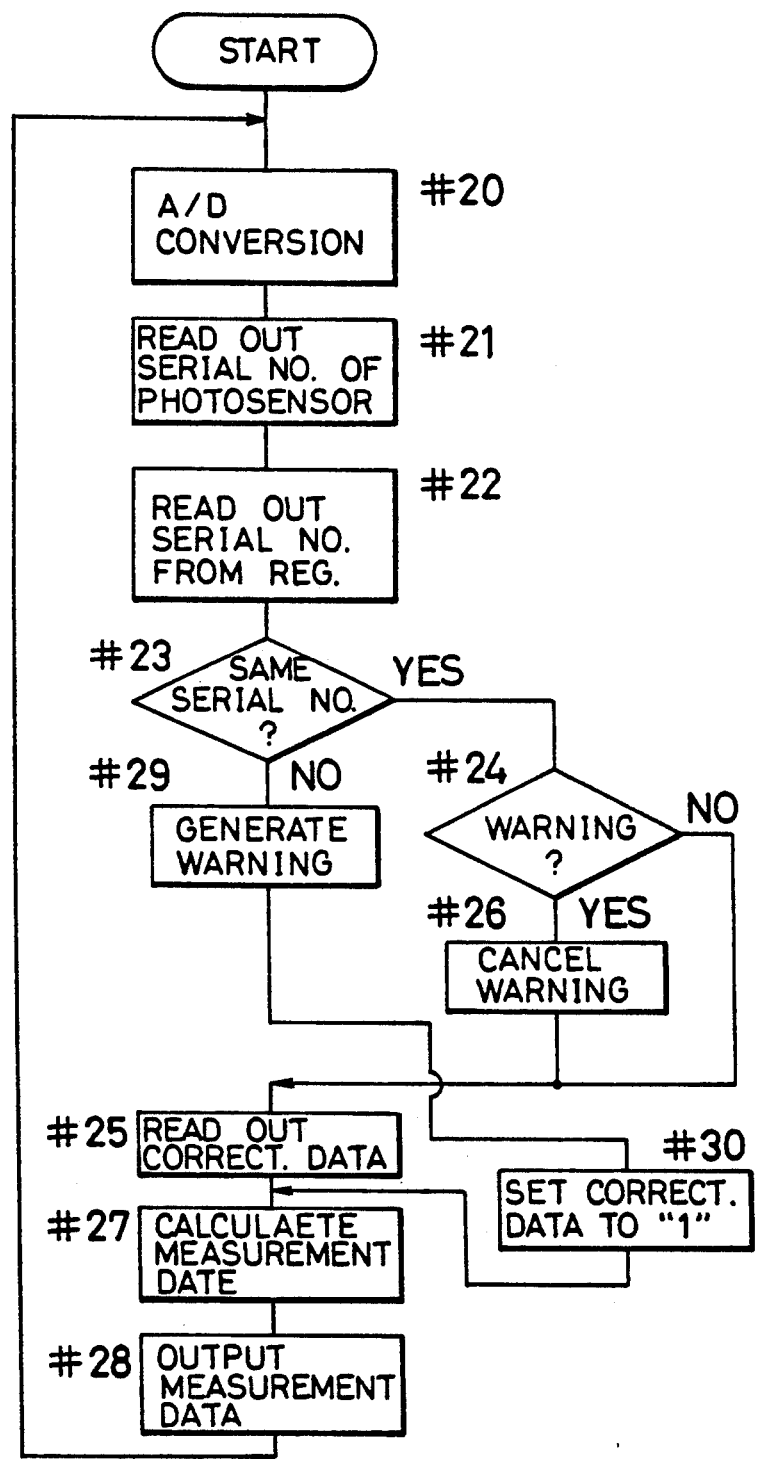
FIG. 18 is a flowchart showing an operation routine for determining whether an already corrected photosensor probe has been connected before measuring.

Described next, with reference to FIGS. 17 and 18, is how the light measurement device determines whether the already corrected photosensor probe is used at the time of correction (re-correction) or measurement.

FIG. 17 is a flowchart showing the operation of correction (re-correction).

First, a photosensor probe 101 to be corrected is connected to the main body 110 of the light measurement device, by which appropriate reference light is measured. Then, correction data is calculated in the calculation unit 112 from the digital data outputted from the A/D converter 111 and the input data of the data setting unit 117 according to the above-mentioned correction (Step #11). The correction data thus obtained is stored in the correction data register 113b of the memory unit 113 as the controller 119 transmits a control signal (Step #12). Subsequently, also, with the control signal outputted from the controller 119, the specific serial number of the photosensor probe 101 previously stored in the serial number memory 102 is read out (Step #13) and stored in the serial number register 113a (Step #14).

Next, FIG. 18 is a flowchart showing how the light measurement device determines whether an already corrected photosensor probe 101 has been connected before measuring.

When measurement is started, the signal obtained by the photoelectric conversion circuit 103 is delivered to the A/D converter 111 of the main body 110 of the light measurement device, where the signal is converted into digital data (Step #20). Next, the serial number of the photosensor probe 101 is read out (Step #21) while the serial number of the already corrected photosensor probe 101 stored in the main body 110 is read out from the serial number register 113a (Step #22). Both of these serial numbers are then compared by the serial number comparator 115 to check whether they agree with one another (Step #23). If the serial numbers are identical (Yes in Step #23), it is determined that the photosensor probe 101 is the one already corrected with the main body 110 of the light measurement device and the routine advances to Step #24, where a judgment is made to check whether a warning is already generated. Since no warning is generated yet when checking the photosensor probe 101 connected at the beginning of measurement, the routine advances to Step #25. If, however, the photosensor probe 101 was not corrected and replaced with the corrected one, or when measurement is made immediately after calibrating the photosensor probe 101, a warning is still active. Thus, the warning is cancelled at first (Step #26) before proceeding to Step #25.

In either case, since the currently connected photosensor probe 101 is the corrected one at this stage (Yes in Step #23), the previously obtained correction data which is stored in the correction data register 113b is read out (Step #25) and delivered to the calculation unit 112 together with the digital data fed from the A/D converter 111. Measurement data is then calculated in the calculation unit 112 (Step #27) and the result is outputted to the display unit 114 for display (Step #28).

On the other hand, if the serial numbers do not coincide in Step #23, it is determined that the photosensor probe 101 is not the one already corrected with the main body 110 of the light measurement device and a warning is generated to alert the operator (Step #29). In this case, the value "1" is used as correction data regardless of the correction data of the correction data register 113b, that is, the digital data obtained by the A/D converter 111 is directly delivered to the calculation unit 112 to display the measurement data as if it has been corrected (Steps #30, #27 and #28 ). A provisional measurement value to be used for reference can be obtained in this way. In the case of serial number discordance, the photosensor probe 101 is corrected according to the flowchart shown in FIG. 17.

In the second light measurement device, the main body 110 includes one serial number register 113a and one correction data register 113b in the memory unit 113. Next, a third light measurement device of the present invention will be described which includes a plurality of serial number registers and correction data registers as well as a plurality of channels (not illustrated). Further, the third light measurement device is provided with multiple connectors so that more than one photosensor probe 101 can be connected at one time to the main body.

Figure 19:
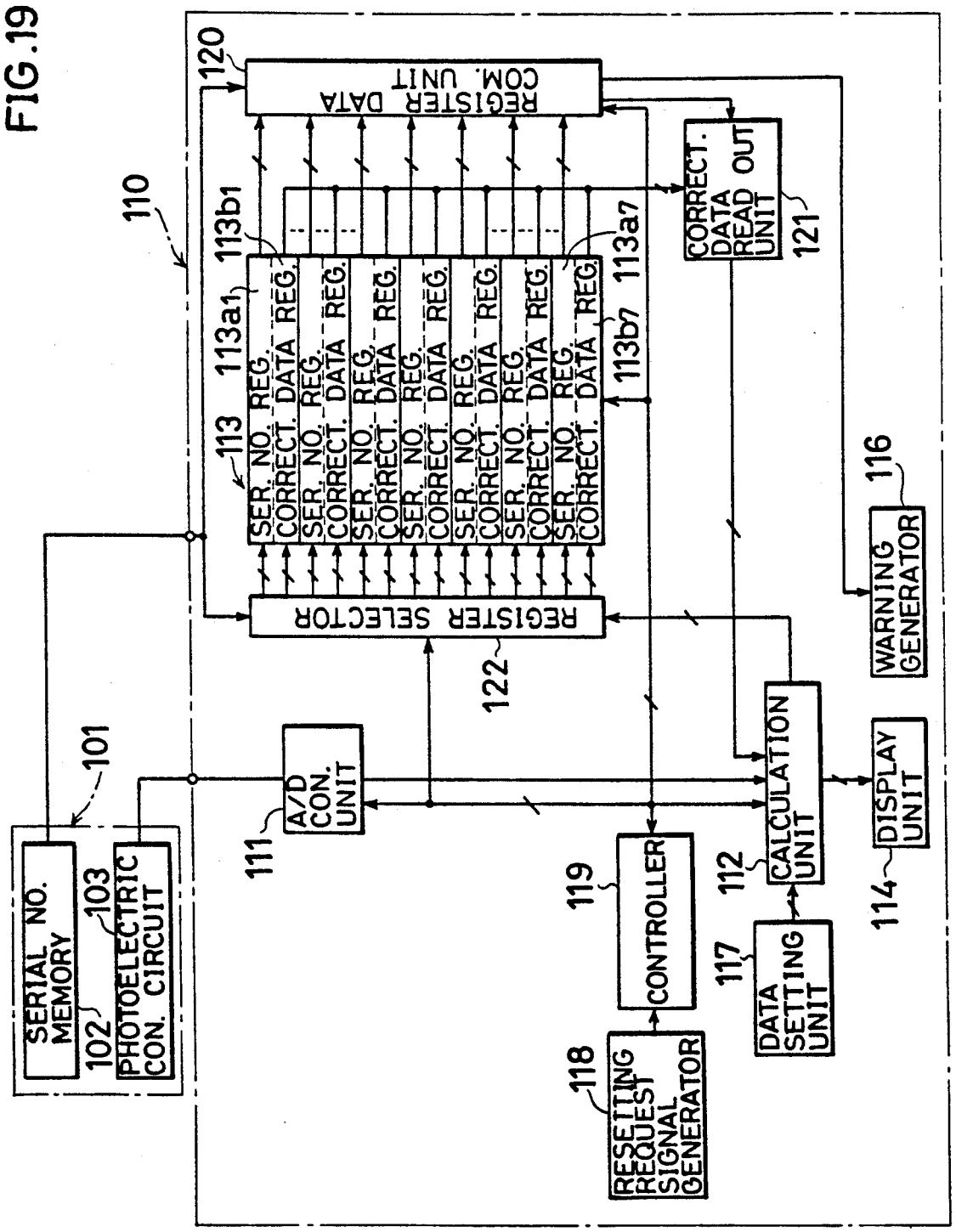
FIG. 19 is a block diagram showing a third light measurement device of the present invention.

FIG. 19 is a block diagram showing the third light measurement device, parts which are given identical numbers to the light measurement device of FIG. performing the same functions. A data setting unit 117 shown in FIG. 19 is designed to allow setting of photosensor probe specification data (e.g. connector numbers) as used when more than one photosensor probe are connected and channel specification data to be described later in addition to the data entered for correction. Further, a memory unit 113 includes several serial number registers and corresponding correction data registers.

Further, this light measurement device is provided with multiple channels of memory units which are not illustrated, each having the same configuration with the memory unit 113 to enable storage of correction data corresponding to the reference light which differs from one channel to another.

Indicated at 120 is a register data search and comparison unit for temporarily storing the serial number read out from the photosensor probe 101 and then searching through individual serial number registers 113a1 to 113a7 to check whether they contain the same serial number. Indicated at 121 is a correction data readout circuit for reading the correction data out of the correction data register 113b corresponding to the serial number register 113a in which the same serial number searched by the register data search and comparison unit 120 is stored. Indicated at 122 is a register selector for selecting the serial number register 113a into which the correction data calculated by the calculation unit 112 is stored when executing correction to be described later, or the correction data register 113b corresponding to the serial number register 113a for storing the serial number of the photosensor probe 101 when reading its correction data at the time of measurement.

Figure 20:
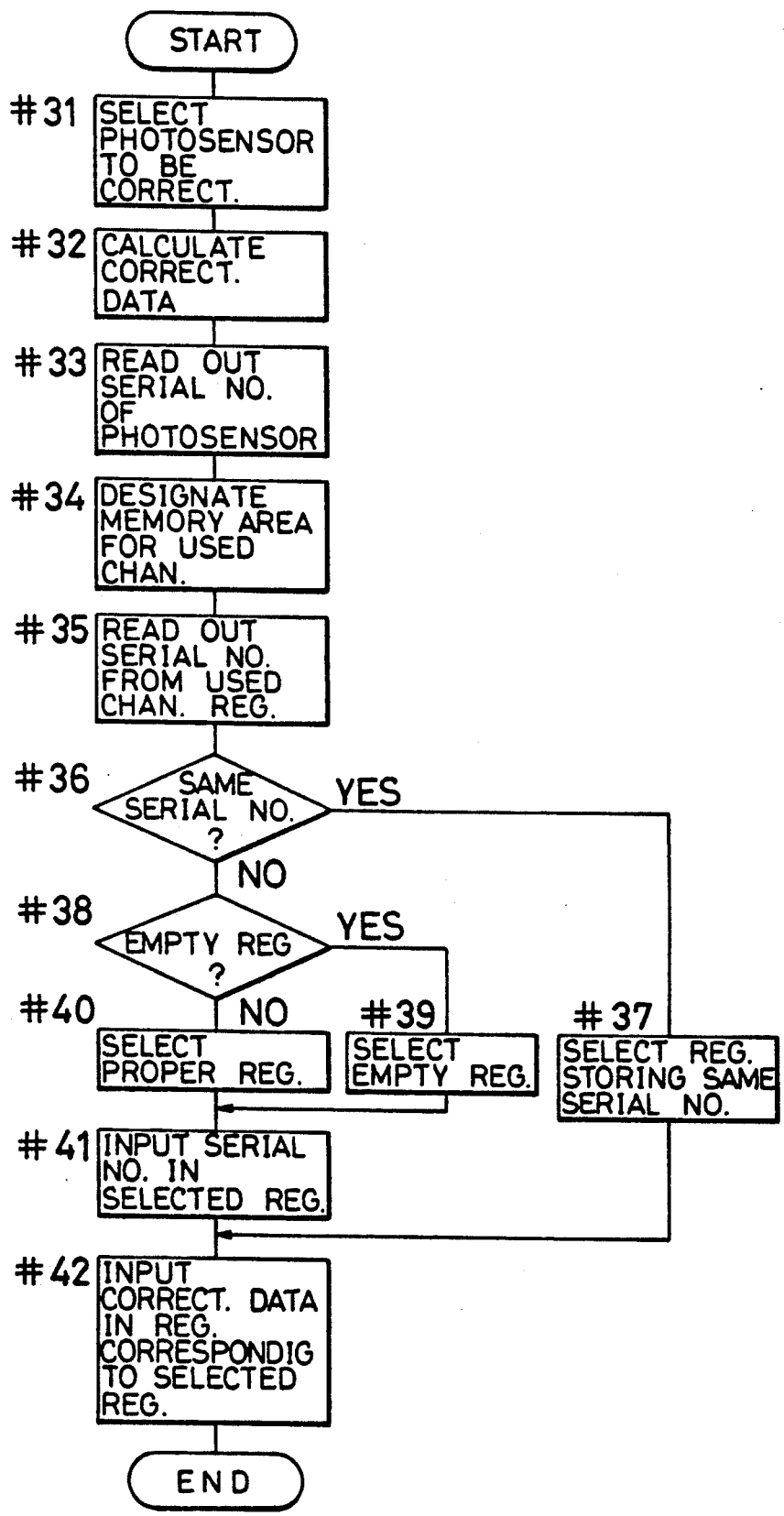
FIG. 20 is a flowchart showing a correction operation of the light measurement device.

Now, the operation of the correction (re-correction) of the third light measurement device will be described with reference to a flowchart of FIG. 20.

Correction (re-correction) is started after a correction request signal is outputted as already described.

Considering the case where more than one photosensor probe 101 is connected, the operator selects a connector to which the photosensor probe 101 to be corrected is connected and enters its data to the data setting unit 117 (Step #31). Then, correction data is calculated in the calculation unit 112 from the digital data of the selected photosensor probe 101 outputted from the A/D converter 111 and the input data of the data setting unit 117 according to the above mentioned correction (Step #32).

Next, a specific serial number of the photosensor probe 101 is read out of the serial number memory 102 (Step #33) and temporarily stored in the register data search and comparison unit 120. Here, if the operator specifies the memory unit 113 of the channel to be used (Step #34), the register selector 122 selects the memory unit 113 of the specified channel and the serial numbers stored in the serial number registers 113a1 to 113a7 within the memory unit 113 are read out in sequence (Step #35). Then, the serial numbers sequentially read out are compared with the serial number stored in the register data search and comparison unit 120. When the same serial number has been found (Yes in Step #36), the serial number register 113a which stores this serial number is selected (Step #37) and the correction data obtained in Step #32 is transferred and stored in the correction data register 113b corresponding to the serial number register 113a (Step #42).

On the other hand, when the same serial number is not found when searching through the serial number registers 113a1 to 113a7, a search is conducted for an empty serial number register 113a which does not store any serial number yet (Step #38). More specifically, the controller 119 causes the register selector 122 and register data search and comparison unit 120 to sequentially read the contents of individual serial number registers 113a in search of a serial number register 113a which stores invalid data. If such a serial number register 113a has been found, it is selected (Step #39) and the serial number read out in Step #33 is transferred and stored in it (Step #41). Further, the correction data obtained in Step #32 is transferred and stored in the correction data register 113b corresponding to the selected serial number register 113a (Step #42).

On the contrary, when an empty serial number register 113a is not found in Step #38, that is, different serial numbers are already stored in the serial number registers 113a1 to 113a7, the current serial number is overwritten in the serial number register 113a which may be manually selected by the operator as appropriate. Alternatively, the serial number may be stored in the serial number register 113a which has most recently stored a serial number if the order of correction (1 to 7) is stored in the serial number registers 113a1 to 113a7, or in the serial number register 113a which stores another serial number than that of the photosensor probe 101 presently connected (Steps #40 and #41). Here again, correction data is transferred and stored in the correction data register 113b corresponding to the selected serial number register 113a (Step #42 ).

Figure 21:
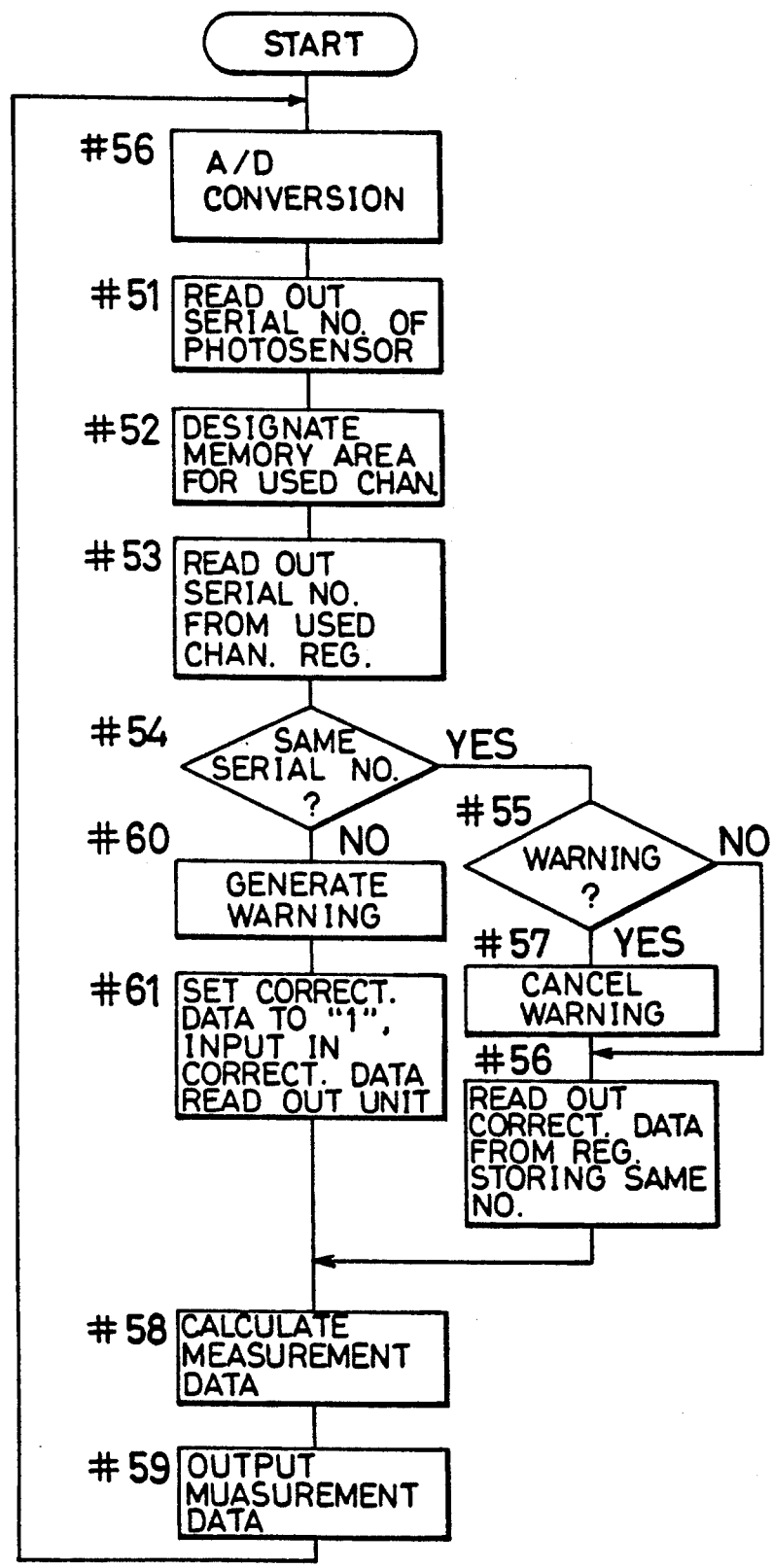
FIG. 21 is a flowchart showing an operation routine for determining whether an already corrected photosensor probe has been connected before measuring.

FIG. 21 is a flowchart showing how the third light measurement device determines whether an already corrected photosensor probe 101 has been connected before measuring.

When measurement is started, the signal obtained by the photoelectric conversion circuit 103 of the presently used photosensor probe 101 is delivered to the A/D converter 111 of the main body 110, where the signal is converted into digital data (Step #50 ). Next, the serial number of the photosensor probe 101 is read out (Step #51). Here, if the operator manually specifies the channel to be used, the register selector 122 specifies the memory unit 113 of that channel (Step #52) and the serial numbers stored in the serial number registers 113a1 to 113a7 within the memory unit 113 are read out in sequence (Step #53). Then, the register data search and comparison unit 120 performs comparison to determine whether any of the serial numbers read out of the serial number registers 113a1 to 113a7 coincides with the serial number of the currently used photosensor probe 101 (Step #54).

If the same serial number is found (Yes in Step #54), it is determined that the photosensor probe 101 is the one already corrected with the main body 110 and the routine advances to Step #55, where a judgment is made to check whether a warning is already generated. Since no warning is generated yet when checking the photosensor probe 101 connected at the beginning of measurement, the routine advances to Step #56. If, however, the photosensor probe 101 was not corrected and replaced with the corrected one, or when measurement is made immediately after calibrating the photosensor probe 101, a warning is still active. Thus, the warning is cancelled at first (Step #57) before proceeding to Step #56.

In either case, since the photosensor probe 101 connected is already corrected with the currently used channel (Yes in Step #54), the previously obtained correction data is read out of the correction data register 113b corresponding to the serial number register 113a which stores the same serial number as detected above (Step #56), and delivered to the calculation unit 112 together with the digital data fed from the A/D converter 111. Measurement data is then calculated in the calculation unit 112 (Step #58) and the result is outputted to the display unit 114 for display (Step #59).

On the other hand, if the same serial number is not found in Step #54 when searching through the serial number registers 113a1 to 113a7, it is determined that the photosensor probe 101 is not the one already corrected with the main body 110 and a warning is generated to alert the operator ( Step #60 ). In this case, the value "1" is used as correction data regardless of the correction data of the correction data register 113b, that is, the digital data obtained by the A/D converter 111 is directly delivered to the calculation unit 112 to display the measurement data as if it has been corrected (Steps #61, #58 and #59). A provisional measurement value to be used for reference can be obtained in this way.

Since the warning is still active even when the above mentioned provisional measurement value is displayed, the routine returns to Step #40 and a succeeding measurement is carried out. In the case of serial number discordance, the photosensor probe 101 is corrected according to the flowchart shown in FIG. 20.

While the present invention has so far been described by using the correction factor K as correction data, it is also possible to adopt values described below as correction data.

In an alternative correction, the output data of the photosensor probe already obtained by measuring the reference light is stored as a reference value, and in later measurements with the photosensor probe the deviation of the output data from the reference value is used as a measurement value. In another alternative correction, a factor is calculated from the output data of the photosensor probe obtained by measuring the reference light, and a measurement value is obtained by processing the output data of the photosensor probe with the factor in later measurements.

If a photosensor probe not corrected in such a manner is connected and the resultant measurement data is processed with correction data such as the above mentioned reference value or factor, the third light measurement device will output incorrect measurement results. Accordingly, it is required to generate a warning in the case of serial number discordance as well.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A light measurement device comprising:
   photoelectric conversion means for receiving light from an object to be measured and for converting the light to an output electrical signal representative of the intensity of the light;
   temperature measurement means for measuring a temperature of the photoelectric conversion means;
   offset amount measurement means for measuring an offset amount from the photoelectric conversion means in the absence of any light at an initial time period;
   means for storing the measured offset amount;
   means for storing an initial temperature of the photoelectric conversion means measured at the initial time period of the measurement of the offset amount;
   means for measuring light from an object at a predetermined time period after the initial time period;
   means for storing an output electrical signal representative of the intensity of the measured light from the object at the predetermined time period;
   means for storing a temperature of the photoelectric conversion means measured at the same predetermined time period of the measurement of light from the object;
   calculation means for subtracting the stored offset amount from the stored output electrical signal of the measured light from the object to produce a corrected output electrical signal of the measured light from the object;
   means for outputting a permissible temperature difference, wherein the permissible temperature difference represents a permissible error of the output of the photoelectric conversion means;
   judging means for judging whether a difference between the stored initial temperature and the stored temperature at the predetermined time period exceeds the output permissible temperature difference; and
   warning means for warning when said judging means judges the difference between the initial temperature and the temperature at the predetermined time period exceeds the permissible temperature difference so that the offset amount measurement means must be employed before means for measuring light from the object can be employed.

2. A light measurement device according to claim 1, wherein said permissible temperature difference outputting means includes:
   means for storing a relationship between permissible temperature differences and the corrected output electrical signals from the photoelectric conversion means such that the larger the output signal from the photoelectric conversion means, the greater the permissible temperature difference; and
   read means for reading a permissible temperature difference corresponding to the corrected output electrical signal of the measured light from the object.

3. A light measurement device according to claim 2, wherein a range of the corrected output electrical signals from the photoelectric conversion means has the same permissible temperature difference.

4. The light measurement device of claim 1 further comprising:
   means to store characteristics of the photoconversion means, said characteristics determined from a relationship between temperature and output of the photoconversion means; and
   compensation means for compensating the stored output electrical signal representative of the intensity of the measured light from the object based on the calculated temperature difference and stored characteristics of the photoconversion means to compensate for an error of the output of the photoelectric conversion means caused by a change in temperature thereof.

5. A light measurement device comprising:
   photoelectric conversion means for receiving light from an object to be measured and for converting the light to an output electrical signal representative of the intensity of the light;
   temperature measurement means for measuring a temperature of the photoelectric conversion means;
   correction means for correcting the photoelectric conversion means so as to output an accurate electrical signal at an initial time period;
   means for storing an initial temperature of the photoelectric conversion means measured at the initial time period of the correction;
   means for measuring light from an object at a predetermined time period after the initial time period;
   means for storing an output electrical signal representative of the intensity of the measured light from the object at the predetermined time period;
   means for storing a temperature of the photoelectric conversion means measured at the same predetermined time period of the measurement of light from the object;
   calculation means for calculating a temperature difference between the stored initial temperature and the stored temperature at the predetermined time period; and
   compensation means for compensating the stored output electrical signal representative of the intensity of the measured light from the object based on the calculated temperature difference to compensate for an error of the output of the photoelectric conversion means caused by a change in temperature thereof.

6. A light measurement device according to claim 5, further comprising:

means for storing a temperature characteristic of the photoelectric conversion means, and wherein said compensation means compensates the stored output electrical signal based on the calculated temperature difference and the stored temperature characteristic.

7. A light measurement device according to claim 6, wherein said temperature characteristic is determined by a relationship between the temperature difference and the output electrical signal representative of the intensity of the measured light from the object.

8. A light measurement device comprising:
photoelectric conversion means for receiving light from an object to be measured and for converting the light to an output electrical signal representative of the intensity of the light;
temperature measurement means for measuring a temperature of the photoelectric conversion means;
correction means for correcting the photoelectric conversion means so as to output an accurate electrical signal at an initial time period;
means for storing an initial temperature of the photoelectric conversion means measured at the initial time period of the correction;
means for measuring light from an object at a predetermined time period after the initial time period;
means for storing an output electrical signal representative of the intensity of the measured light from the object at the predetermined time period;
means for storing a temperature of the photoelectric conversion means measured at the same predetermined time period of the measurement of light from the object;
means for storing a temperature characteristic of the photoelectric conversion means; and
compensation means for compensating the stored output electrical signal representative of the intensity of the measured light from the object based on the stored initial temperature, the stored temperature at the predetermined time period, and the stored temperature characteristic to compensate for an error of the output of the photoelectric conversion means caused by a change in temperature thereof.

9. A light measurement device according to claim 8, further comprising:
calculation means for calculating temperature difference between the stored initial temperature and the stored temperature at the predetermined time period, and wherein said temperature characteristic is determined by a relationship between the temperature difference and the output electrical signal representative of the intensity of the measured light from the object.

10. A light measurement device according to claim 8, further comprising:
calculation means for calculating a temperature difference between the stored initial temperature and the stored temperature at the predetermined time period, and wherein said temperature characteristic is determined by a relationship between the temperature difference and the time rate of change in the output electrical signal.

11. A light measurement device according to claim 8, further comprising:
calculation means for calculating a temperature difference between the stored initial temperature and the stored temperature at the predetermined time period, and wherein said compensation means includes a thermistor for receiving the output electrical signal, and wherein said temperature characteristic is determined by a relationship between the temperature difference and a resistance of the thermistor.

12. A light measurement device comprising:
photoelectric conversion means for receiving light from an object to be measured and for converting the light to an output electrical signal representative of the intensity of the light;
temperature measurement means for measuring a temperature of the photoelectric conversion means;
offset amount measurement means for measuring an offset amount from the photoelectric conversion means in the absence of any light at an initial time period;
means for storing the measured offset amount;
means for storing an initial temperature of the photoelectric conversion means measured at the initial time period of the measurement of the offset amount;
means for measuring light from an object at a predetermined time period after the initial time period;
means for storing an output electrical signal representative of the intensity of the measured light from the object at the predetermined time period;
means for storing a temperature of the photoelectric conversion means measured at the same predetermined time period of the measurement of light form the object;
calculation means for subtracting the stored offset amount from the stored output electrical signal of the measured light from the object to produce a corrected output electrical signal of the measured light from the object;
means for outputting a permissible temperature difference, wherein the permissible temperature difference represents a permissible error of the output of the photoelectric conversion means, and wherein the permissible temperature difference is determined by reference to the corrected output electrical signal of the measured light of the object;
judging means for judging whether a difference between the stored initial temperature and the stored temperature at the predetermined time period exceeds the output permissible temperature difference; and
warning means for warning when said judging means judges the difference between the initial temperature and the temperature at the predetermined time period exceeds the permissible temperature difference so that the offset amount measurement means must be employed before means for measuring light from the object can be employed.

13. A light measurement device according to claim 12, wherein said permissible temperature difference outputting means includes:
means for storing a relationship between permissible temperature differences and the corrected output electrical signals from the photoelectric conversion means such that the larger the output signal from the photoelectric conversion means, the greater the permissible temperature difference; and
read means for reading a permissible temperature difference corresponding to the corrected output electrical signal of the measured light from the object.

14. A light measurement device according to claim 13, wherein a range of the corrected output electrical signals from the photoelectric conversion means has the same permissible temperature difference.

* * * * *